US008438802B1

(12) United States Patent
Hay et al.

(10) Patent No.: US 8,438,802 B1
(45) **Date of Patent: *May 14, 2013**

(54) ACCESSORY MOUNTING DEVICES FOR WINDOW SYSTEMS

(75) Inventors: Henry M. Hay, Charleston, SC (US); Bruce Weber, Summerville, SC (US)

(73) Assignee: The Muhler Company, Inc., North Charleston, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,644

(22) Filed: May 14, 2012

Related U.S. Application Data

(63) Continuation of application No. 12/432,079, filed on Apr. 29, 2009, now Pat. No. 8,196,363, and a continuation-in-part of application No. 12/079,714, filed on Mar. 28, 2008, now abandoned.

(60) Provisional application No. 61/145,857, filed on Jan. 20, 2009.

(51) Int. Cl.

| | |
|---|---|
| ***E06B 3/964*** | (2006.01) |
| ***E06B 3/988*** | (2006.01) |
| ***E06B 3/26*** | (2006.01) |
| ***E06B 3/32*** | (2006.01) |
| ***E06B 3/68*** | (2006.01) |
| ***E05C 21/02*** | (2006.01) |
| ***F16B 13/06*** | (2006.01) |

(52) U.S. Cl.
USPC .... 52/204.62; 52/202; 52/204.63; 52/204.64; 52/204.66; 52/204.7; 49/463; 49/465; 49/50; 49/57; 411/45; 411/46; 411/47; 411/48

(58) Field of Classification Search .................... 52/202, 52/204.62–204.67, 204.7; 49/463, 465, 50, 49/57; 411/45–48, 182, 508
See application file for complete search history.

(56) References Cited

U.S. PATENT DOCUMENTS

| | | | | | |
|---|---|---|---|---|---|
| 3,127,807 | A * | 4/1964 | Modrey | 411/340 |
| 3,678,798 | A * | 7/1972 | Van Niel | 411/43 |
| 4,174,596 | A | 11/1979 | Debele | |
| 1,732,519 | A | 3/1988 | Wagner | |
| 4,861,540 | A * | 8/1989 | Nieboer et al. | 264/263 |
| 4,865,505 | A * | 9/1989 | Okada | 411/512 |
| 5,324,147 | A | 6/1994 | Leon | |
| 5,593,262 | A | 1/1997 | Gedeon et al. | |
| 5,941,031 | A * | 8/1999 | Fullwood | 52/202 |
| 6,014,841 | A * | 1/2000 | McCoy et al. | 52/19 |
| 6,074,119 | A | 6/2000 | Schlanger | |

(Continued)

*Primary Examiner* — Phi Dieu Tran A
*Assistant Examiner* — Omar Hijaz
(74) *Attorney, Agent, or Firm* — Barnwell Whaley Patterson & Helms, LLC

(57) ABSTRACT

A window system for installation in a structure is provided. The window system includes a front side that faces away from the structure and a back side that faces into the structure when the window system is installed in a structure. The window system further includes at least one window pane having a front side that faces away from the structure and a back side that faces into the structure when the window system is installed in a structure; at least one sash that surrounds the at least one window pane, wherein the sash has a front side that faces away from the structure and a back side that faces into the structure when the window system is installed in a structure; at least one window frame comprising at least one head, sill, and jamb; and at least one mounting base integral to the window.

15 Claims, 9 Drawing Sheets

U.S. PATENT DOCUMENTS 6,230,455 B1 * 5/2001 Arehart et al. .................. 52/202
6,532,702 B1 3/2003 Scribner
8,083,450 B1 * 12/2011 Smith et al. ................... 411/112
2006/0230695 A1 * 10/2006 Swergold ........................ 52/202
2007/0000193 A1 1/2007 Beaupre et al.
2007/0204530 A1 * 9/2007 Janesky ..................... 52/169.14

* cited by examiner

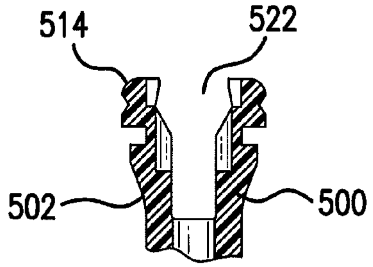
FIG.5
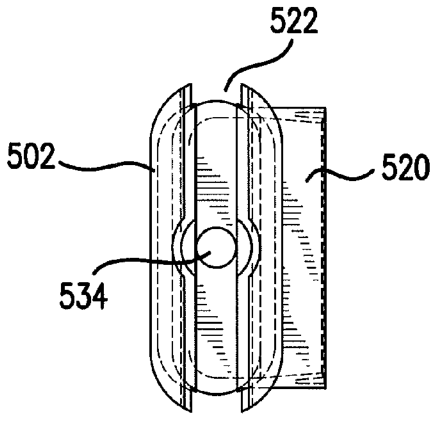
FIG.6
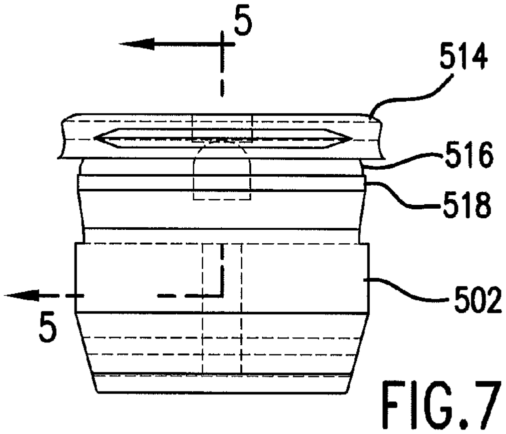
FIG.7
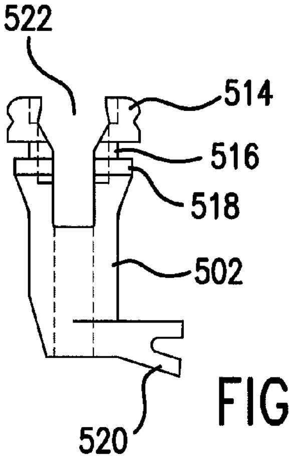
FIG.8
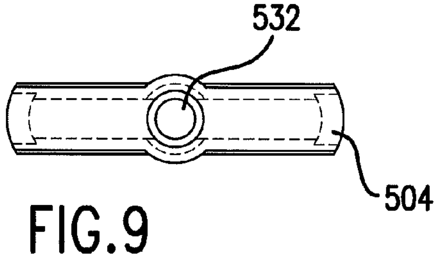
FIG.9
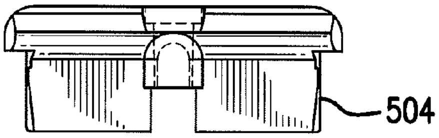
FIG.10
FIG.11
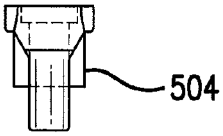

ACCESSORY MOUNTING DEVICES FOR WINDOW SYSTEMS

This application is a continuation of pending application Ser. No. 12/432,079, which was filed on Mar. 29, 2009, which is a continuation-in-part of application Ser. No. 12/079,714, filed Mar. 28, 2008. Applicant claims the benefit of provisional application Ser. No. 61/145,857 filed Jan. 20, 2009, from which application Ser. No. 12/432,079 filed Mar. 29, 2009 claimed priority.

BACKGROUND OF THE INVENTION

The present invention relates to a window system with a mounting base for the window system, as well as methods for manufacturing such windows and using such windows.

It is often desirable to attach an object to a window. For instance, decorative objects are often desired to be attached to the interior or exterior of a window. Such decorative objects can include window treatments; such as shutters, blinds, or shades; bird feeders; thermostats; rain gauges; wind chimes; wind socks; and flags. In addition, it is often desirable to attach security objects, such as security bars, or safety objects, such as safety bars, to a window.

In addition, because windows are generally the weakest portions of a structure, it is often desirable to protect them from storm conditions and hazards, including wind and wind-borne debris. As such, objects are commonly installed over windows to protect them from such conditions. Absent protection, the windows could suffer damage, including broken glass, which is a potential hazard in storm conditions. In addition, damage to windows can expose a building's interior, and such exposure can result in further damage from wind and rain. Window protection is particularly desirable in coastal areas subject to hurricanes and tropical storms, and particular standards of suitable protection may be locally regulated.

Many current storm protection options have undesirable drawbacks. For instance, some current options are aesthetically unpleasing and require expensive and time-consuming installation, often by professionals. Other options cause damage to the structure upon which the protection is installed. In addition, since a storm can escalate very quickly, leaving structure owners with only a little time to prepare, it is imperative that the owner be capable of quickly installing storm protection objects.

One common option is affixing pieces of plywood over each window. The plywood, however, is often nailed or screwed to the structure or window frame, which leaves holes that must be patched and painted. Similarly, some structure owners place tape over windows, but the tape offers minimal protection and is prone to leave a residue requiring effort to remove.

Another common method of protecting windows from storm conditions involves installing storm panels over the windows. These panels are typically found in elongated sections that can be arranged vertically or horizontally across a window or other opening in a structure. Each panel is typically placed edge-to-edge with other panels to cover an entire opening. The panels may be made of corrugated metal, such as extruded corrugated aluminum.

Storm panels typically are mounted on the exterior wall of a structure. To facilitate installation, tracks to receive and support the panels often are mounted permanently onto a structure's exterior wall surrounding an opening. These tracks require extensive cost and labor to install. In most instances, a professional must visit the structure site and measure the windows. Then, the tracks must be cut to appropriate sizes. Finally, the professional must return the structure site and install the tracks, which are often difficult on multi-level homes. In addition, the tracks are aesthetically unpleasing as permanent fixtures.

SUMMARY OF THE INVENTION

In one aspect, the present invention is a window system for installation in a structure. The window system includes a front side that faces away from the structure and a back side that faces into the structure when the window system is installed in a structure. The window system further includes at least one window pane having a front side that faces away from the structure and a back side that faces into the structure when the window system is installed in a structure; at least one sash that surrounds the at least one window pane, wherein the sash has a front side that faces away from the structure and a back side that faces into the structure when the window system is installed in a structure; at least one window frame comprising at least one head, sill, and jamb; and at least one mounting base for the window.

In another aspect, the present invention is a method for removably mating an attachment to a window system. The method includes the step of removably mating the attachment to a mounting base that is affixed to the window system.

In yet another aspect, the present invention is a method for protecting a structure. The method includes the step of removably mating a storm protection apparatus to a window system. In this method, the window system comprises a front side that faces away from a structure when installed and a back side that faces into the structure when installed in a structure; at least one window pane; at least one sash that surrounds the at least one window pane; at least one window frame; and at least one mounting base for the window system and capable of removably mating to a protective cover.

In a different aspect, the present invention is a method for manufacturing a window system having a front side and a back side. The method includes mounting at least one window pane within at least one sash; mounting the at least one sash within a window frame; and installing at least one mounting base to the window system.

In another aspect, the present invention is a method for retrofitting a window system to engage an attachment. This method includes installing at least one mounting base for the window system.

BRIEF DESCRIPTION OF THE DRAWINGS

FIGS. 5 through 18 demonstrate an embodiment of a mounting base.

FIG. 5 is a sectioned view taken essentially along line 5-5 of FIG. 7.

FIG. 6 is a top plan view of a female body of a mounting base.

FIG. 7 is a side elevation of the female body of FIG. 6.

FIG. 8 is an end view of the female body of FIG. 6.

FIG. 9 is a top plan view of a male body of the mounting base.

FIG. 10 is a side elevation of the male body of FIG. 9.

FIG. 11 is an end view of the male body of FIG. 10.

FIG. 12 is a partial view of a window frame with a hole or void formed therein for receiving the mounting base.

FIGS. 13 through 19 demonstrate a cross section of the window frame, and illustrate progressive steps of installing a mounting base into the hole or void formed in the window frame.

FIG. 13 shows the female body inserted into the hole or void of the window frame.

FIG. 14 shows the female body progressively inserted in the window frame.

FIG. 15 shows the head of the female body compressed to constrict the female body and allow the neck to be seated in the window frame.

FIG. 16 shows the female body seated in the window frame, with a receptacle in the center of the female body expanded to receive the male body.

FIG. 17 shows the female body with the male body in position in the receptacle.

FIG. 18 shows the mounting base in position in the window frame, with an accessory and a fastener exploded there from.

FIG. 19 shows the mounting base in position in the window frame, with the accessory and fastener engaging the mounting base.

The following detailed description is to be read with reference to the drawings, in which like elements in different drawings have like reference numbers. The drawings, which are not necessarily to scale, depict selected embodiments and are not intended to limit the scope of the invention.

DETAILED DESCRIPTION OF THE EMBODIMENTS

Figure 1:
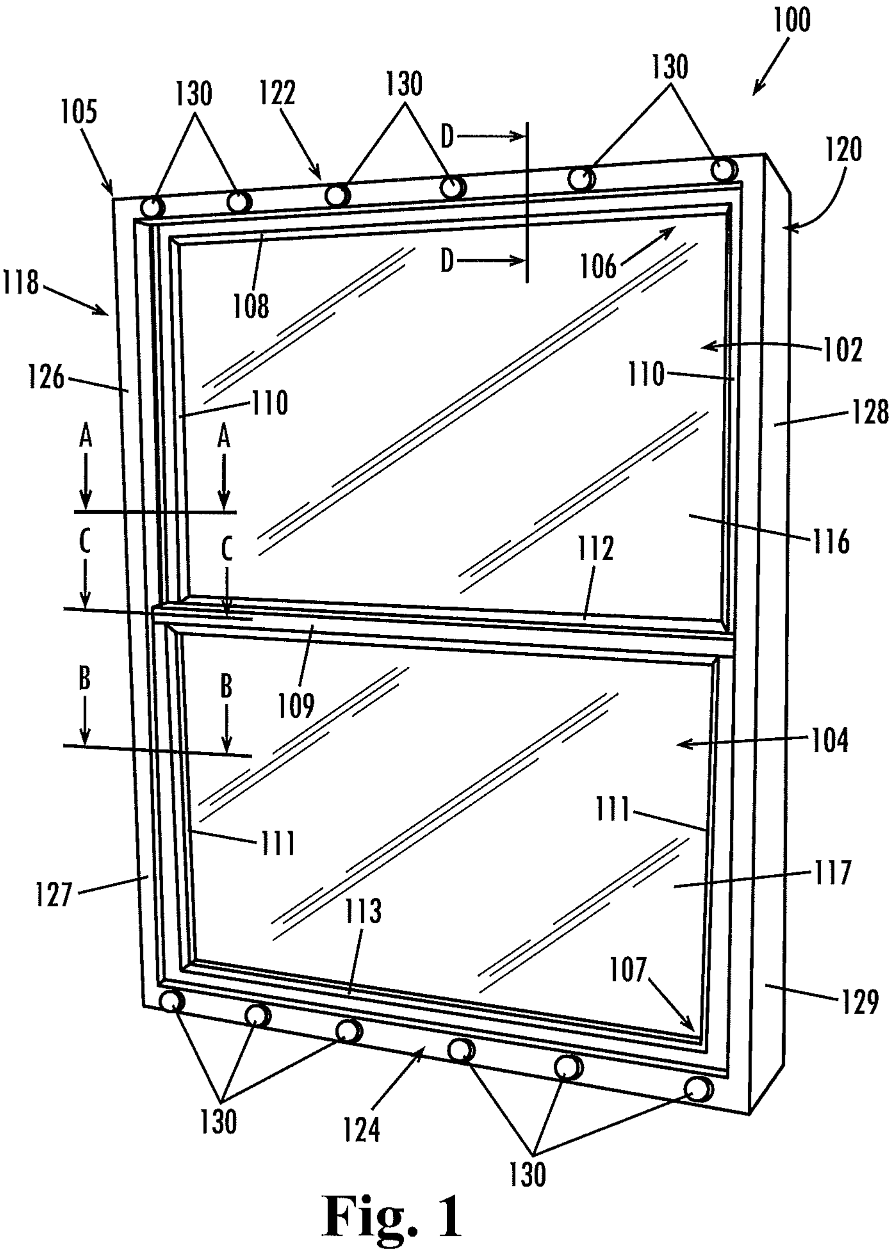
FIG. 1 is a perspective view of a double-hung window 100 in a closed position as viewed from the exterior of a home or building.

In accordance with the present invention, a novel window system has been discovered. The window permits an attachment or multiple attachments to be removably mated to the window in a secure and efficient manner. The novel window system includes at least one mounting base.

As used herein, the term "window system" means fixtures that are installed into or over an opening in a structure. By way of example, as used herein, the term window system may include one or more of windows, doors, screens, and the like. The window system may be commercial or residential use. Any type of window system is within the scope of the present invention, including, but not limited to, fixed panel windows, single-hung windows, double-hung windows, casement windows, horizontal slider windows, bay windows, bow windows, fixed windows, tilt windows, tilt-turn windows, rotating windows, jalousie windows, skylights, and the like.

When the opening is described herein as having a length and a width, what is meant is the longitudinal and latitudinal dimensions of the face of the opening. When referring to an opening on a vertical wall, the length of the opening is the vertical dimension of the opening and the width is the horizontal dimension of the opening.

The present window systems may be installed to protect an opening in any type of structure. For example, the structure can be a one or multi-story building. Additionally, the structure may be a commercial or residential structure.

The window system of the present invention generally comprises a front side and a back side, wherein, when installed in a structure, the front side generally is on the exterior of the structure and the back side generally is on the interior of the structure. The window system generally further comprises at least one window pane, sash, head, sill, jamb, and window frame, each of which includes a front side and back side that corresponds to the front side and back side of the window system.

The sash, head, sill, jamb, and window frame can be constructed of any known window building material or combination of materials, such as wood, composite, and/or vinyl. In particular embodiments, the window system may also include other components, such as rails and latches. The window system can be manufactured as described herein or can be a commercially available window that is subsequently configured as described herein.

When installed in a structure, a window pane generally has a front side that faces the exterior of a structure and an opposing back side that faces the interior of a structure. The present invention contemplates any number of window panes of any size and shape. In addition, a single window may have multiple panes wherein the panes differ in size and/or shape. A window pane can be transparent or translucent, and it can be composed of any material commonly used in the industry, including glass, plastic, laminate, or any combination thereof. Additionally, the window system may include a single pane and/or a multi-pane design, in which at least two panes constitute a first pane and a second pane each of which is opposite and parallel to and spaced apart from the other.

It is further contemplated that the window panes of the present invention can include additional features, such as features for energy efficiency and/or impact resistance. For instance, the window panes may include a film or polymer for increased impact resistance, such as disclosed in patent application Ser. No. 12/070,687, which is incorporated herein by reference. In addition, a gas may be present between the window panes of a multi-pane window system, or low-e glass may be used, to improve energy efficiency.

The window system of the present invention further includes a mounting base that facilitates removably mating an attachment, such as an accessory, to the window. As used herein, "integral" means that the mounting base is a component of the window, but it is not required that a component be formed at the time of manufacture of the window. That is, to be considered integral in the context of the current invention, a component can be manufactured as a part of the window, such as during extrusion, or it can be attached to a window at any point after the window is manufactured. In one embodiment, the mounting base is manufactured as a part of the window.

The terms "mate" and "mating," as used herein, mean to attach, either directly or indirectly, the window system to an attachment. When an object is indirectly mated with an attachment, the window system need not directly contact the attachment to mate with it but instead can be mated to the attachment by way of a connector.

The mounting base can be of any type, wherein "type" when used with reference to a mounting base means the hardware comprising the integral mounting base. For instance, types of mounting bases can include any hardware that facilitates removably attaching an object to the window, such as an anchor, such as a PanelMate® anchor, a bolt, such as a mushroom bolt, a hole or threaded hole, threaded lugs or studs, keyhole slots or other slots, a nut, and other suitable hardware known to those of ordinary skill in the art. A mounting base can be configured as a male or female hardware component, or both. It is understood that a window system can comprise a single type of mounting base or multiple types of mounting bases, and a window system with any quantity and type of mounting bases is within the scope of the present invention.

In some embodiments, it may be preferred that the mounting base be formed of a corrosion resistant material.

In some embodiments of the present invention, a supplement or multiple supplements are inserted into the window system, such as in the hollow area inside of a window frame, to further secure the mounting base to the window system. The supplement can be a solid, such as a synthetic deck board, or a liquid, paste, and/or foam that will harden and secure the mounting base. It is preferred that the solid, liquid, paste, and/or foam does not reach a curing temperature that will distort or react unfavorably when in contact the window or its components. In other embodiments, the mounting base may be secured by extending through the window frame or sash, such as when a bolt is inserted into one face of the window frame and protrudes through the window frame and out the opposing face of the window frame.

A mounting base can be located on the window frame, such as on a head, a sill, and/or a jamb. In other embodiments, a mounting base is alternatively or additionally located on any sash or on multiple sashes of the window. In addition, a mounting base can be located on the front side of the window system and/or on the back side of the window system.

The present invention can comprise any number of mounting bases and the mounting bases can be in any configuration. For instance, a window can have any number of mounting bases that are positioned at any location or combination of locations on a window.

In some embodiments, the mounting bases may be located along a top edge of the window system. In other embodiments, the mounting bases may be located along a bottom edge of the window system. In yet other embodiments, the mounting bases may be located along one or both sides of the window system. It may be desirable to have mounting bases along both the top and bottom edges of the window system, along both sides of the window system, or both. Additionally, it may be desirable to have mounting bases located along either the top or bottom of the window system and on one side of the window system. The mounting bases can further be in any configuration, and the window can further include any combination of types of mounting bases.

Furthermore, any quantity and/or configuration of mounting bases alternatively could be used in accordance with the present invention. Mounting bases could additionally or alternatively be placed on any of the window portions described above on either the front or back side of the window system. Thus, it is appreciated that the quantity, types, configuration, and location of mounting bases can be varied within the scope of the current invention.

It will further be understood that a larger quantity of mounting bases may be desirable on window systems designed to be installed in large openings than will be required on window systems designed to be installed in smaller openings.

The present invention contemplates the mounting base facilitating the mating of an attachment to the window system. By way of example, one attachment that can be mated to the window system by use of a mounting base is a storm protection panel, such as commercially available corrugated steel, aluminum, or LEXAN® storm panels, manufactured, for example, by GE plastics, or fabric storm panels, such as Fabric-Shield™ storm panels, manufactured, for example, by Wayne-Dalton, a roll-down material, such as Storm-a-Rest™ hurricane curtains, manufactured, for example, by Honeywell, a screen, plywood, storm shutters, or any other storm protection object.

Other attachments that a user may desire to mate to the window system by utilizing the at least one mounting base may include decorative items, such as, but not limited to interior or exterior shutters and/or window treatments, such as blinds, shades, and curtains. Other decorative attachments contemplated in accordance with the present invention may include one or more of bird feeders, thermostats, rain gauges, wind chimes, wind socks, and flags. Other contemplated attachments may include security apparatus, such as security bars, and/or safety apparatus, such as bars to prevent children from accidentally falling out of the structure through the window system.

In some embodiments, an attachment is directly attached to the mounting base of the window system. In other embodiments, a connector is used to mate the attachment to the mounting base of the window system. A “connector” means any component that is used in mating an attachment to the mounting base, such as by attaching or securing or fastening. A connector can include, by way of example, pintles for attaching shutters, blind hangers for attaching blinds, or bolts, such as mushroom bolts, screws, wingnuts, threaded bolts, nuts, pins, and other hardware known to those of ordinary skill in the art for mating. A connector can include male or female hardware, both male and female hardware, or neither. Connectors may comprise corrosion resistant materials.

Reference now will be made in detail to some embodiments of the invention. Each embodiment is provided by way of explanation of the invention and not as a limitation of the invention or the broader aspects of the invention. It will be apparent to those of ordinary skill in the art that various modifications and variations can be made in the present invention without departing from the scope or spirit of the invention. For instance, features illustrated or described as part of one embodiment can be used on another embodiment to yield a further embodiment. It is intended that the present invention covers such modifications and variations that come within the scope of the appended claims and their equivalents. In addition, other objects, features, and aspects of the present invention are disclosed in or are obvious from the following detailed description.

FIG. 1 shows one embodiment of the present invention. FIG. 1 is a perspective view of a double-hung window 100 in a closed position as viewed from the exterior of a home or building. The double-hung window 100 has an upper sash 102 and a lower sash 104. Surrounding the upper sash is an inner frame 106 comprising a top rail 108, side rails 110, and bottom rail 112 that hold the upper sash pane 116 in place. Surrounding the lower sash is a inner frame 107 comprising a top rail 109, side rails 111, and bottom rail 113 that hold the lower sash pane 117 in place. The inner frames 106, 107 can be constructed of any known window building material, such as wood or vinyl. When the double-hung window 100 is in the closed position as shown in FIG. 1, upper sash 102 and lower sash 104 meet at a check rail 114.

Outer window frame 105 surrounds the upper sash 102 and lower sash 104 and secures them within the double-hung window 100. Outer window frame 105 has a first side jamb 118, second side jamb 120 head jamb 122, and sill 124. The first side jamb 118 has an upper portion 126 and a lower portion 127. The second side jamb 120 has an upper portion 128 and a lower portion 129. When the window is closed, the top rail 108 of the upper sash 102 sealably contacts the head jamb 122. In the closed position, the bottom rail 113 of the lower sash 104 sealably contacts the sill 124. In the closed position, there are no openings from the interior to the exterior of the double-hung window 100. When the double-hung window 100 is in the closed position, a portion of the upper first side jamb 126 and upper second side jamb 128 is visible from the interior of the window 100.

Figure 1A:
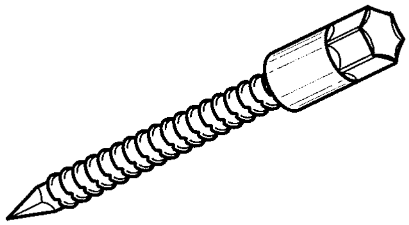
FIG. 1A shows an anchor, specifically a female Panel-Mate® anchor, that can be used as a mounting base on a window system.

Integral to the window 100 is at least one mounting base 130. In FIG. 1, multiple mounting bases 130 are shown integral to the head jamb 122 and the sill 124 of window 100. The mounting bases 130 depicted in this embodiment are female anchors, specifically those called PanelMate® anchors, manufactured by, for example, Cutler-Hammer, that are shown in more detail in FIG. 1A. The mounting bases 130 can be further secured by injecting or inserting a solid, liquid, paste, and/or foam into the outer window frame 105.

From the description above, it will be understood by those having ordinary skill in the art that other types of mounting bases can be used in the present invention, either in addition to or in lieu of the illustrated mounting bases. In addition, additional or alternative mounting bases could be located on the first side jamb 118, second side jamb 120, upper sash 102, and/or lower sash 104. As previously discussed, any configuration or quantity of mounting bases integral to the window system are contemplated in accordance with the present invention.

Figure 2:
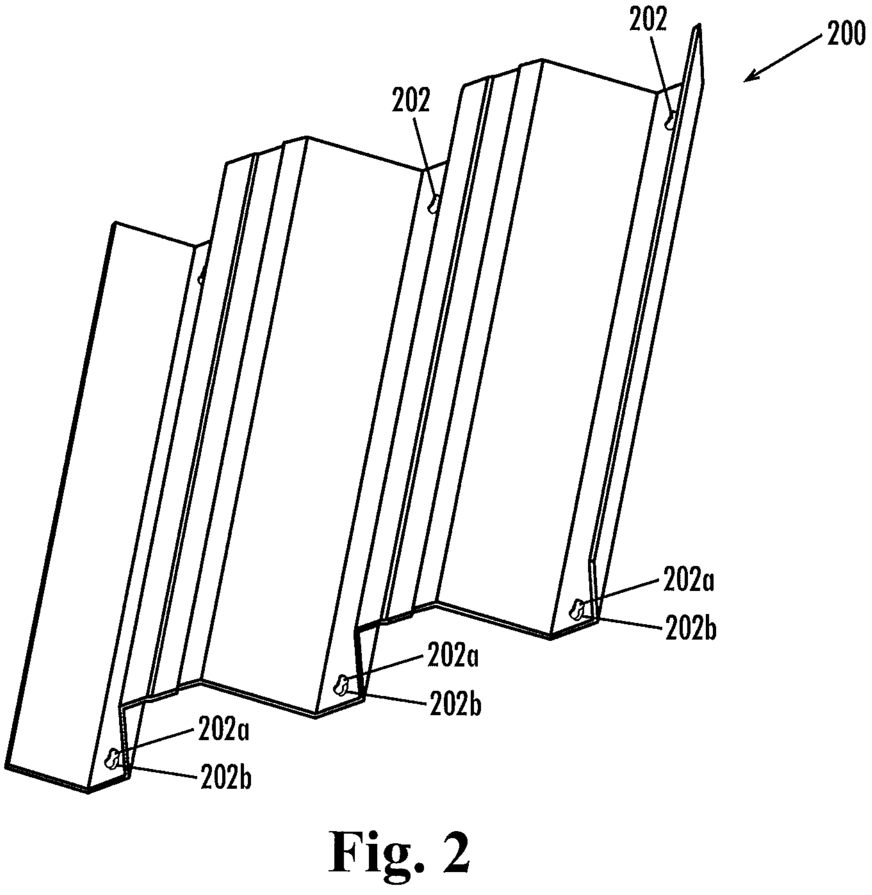
FIG. 2 is a perspective view of a storm panel that can be attached to a window having an integral mounting base, wherein the integral mounting base facilitates the attachment of the storm panel to the window.

As considered in conjunction with FIG. 1, the storm panel 200 depicted in FIG. 2 illustrates another embodiment of the current invention. The storm panel 200 depicted in FIG. 2 is representative of a commercially available storm panel, which is generally constructed of corrugated metal such as aluminum. The storm panel 200 is capable of being removably mated to the window system 100 and the mating is facilitated by at least one mounting base 130 integral to the window system 100. When installed, the storm panel 200 shields the window system 100 and the interior of the structure on which the window system 100 is installed from inclement weather and wind-borne debris. The storm panel 200 includes keyhole slots 202, which have an upper portion 202*a* that is narrower in width than the lower portion 202*b*.

Figure 3:
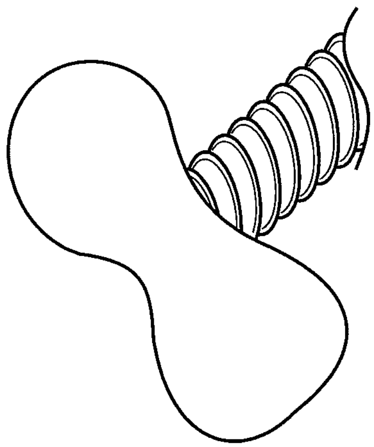
FIG. 3 shows a threaded wingnut that can be used as a connector in attaching an object to a window using the integral mounting base on the window.

The storm panel 200 depicted in FIG. 2 can be removably mated to the window system 100 illustrated in FIG. 1 by utilizing the integral mounting base 130 of the present invention. In one embodiment, to attach the storm panel 200 to the window system 100, at least one keyhole slot 202 of the storm panel 200 is aligned with at least one mounting base 130 of the window system 100. A connector 300 may then be inserted through the at least one keyhole slot 202, either through the upper portion 202*a* or the lower portion 202*b*, and into the at least one mounting base 130. One embodiment of a connector 300 is depicted in FIG. 3 as a threaded wing nut. Other connectors 300 could similarly be used in the depicted embodiment, such as screws, bolts, and other hardware known to one of ordinary skill in the art.

Figure 4:
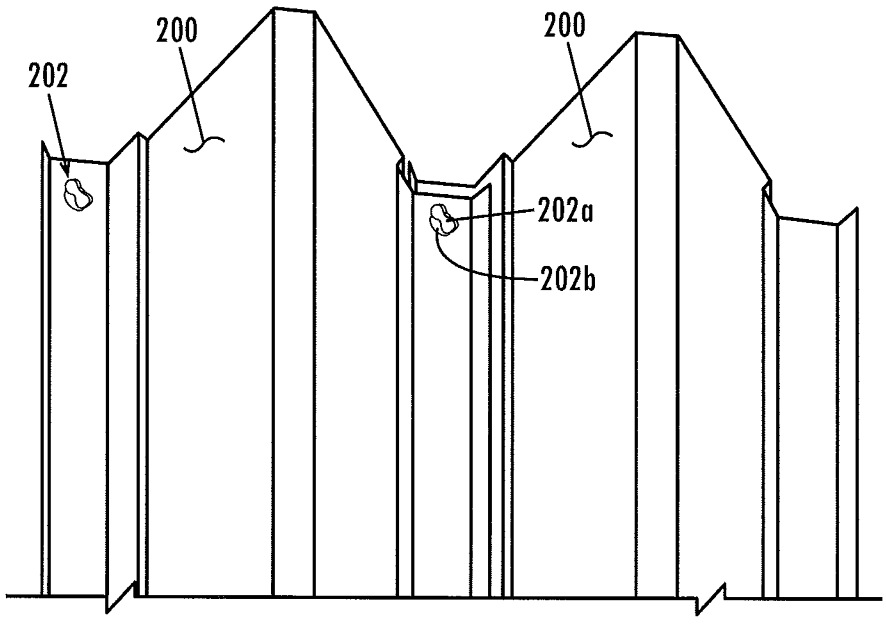
FIG. 4 is a perspective view of two storm panels functioning as a single protective cover unit, wherein the two storm panels overlap on one end and have keyhole slots that align with one another when installed.

In some embodiments of the present invention, multiple storm panels 200 are mated to single window system 100. In some embodiments using multiple storm panels 200, 204, the keyhole slots 202, 206 on more than one protective cover can be mated to a single mounting base 130 on the window system 100. For instance, as shown in FIG. 4, the edge of a first storm panel 200 and the edge of a second storm panel 204 can be overlayed such that a keyhole slot 202 of the first storm panel 200 and a keyhole slot 206 of the second storm panel 204 are aligned. When mated to the window system 100, these aligned keyhole slots 202, 206 are mated to the same mounting base 130 of the window system 100. If necessary, a single fastener 300 can be used in conjunction with the mounting base 130, or multiple fasteners 300 can be used. This overlapping allows multiple storm panels 200, 204 to function as a single unit. Alternatively, a second storm panel 204 can be installed alongside a first storm panel 200 on the window 100 without any overlapping or sharing of an integral mounting base 130.

Another alternative embodiment contemplated by FIGS. 1 and 2 is the use of a mushroom bolt as a connector. In such an embodiment, the attached storm panel 200 can be hung on the mushroom bolt serving as a connector. With reference to FIGS. 1 and 2, an embodiment using a mushroom bolt as a connector 300 would require inserting and securing the mushroom bolt in the mounting base 130. The storm panel 200 could then be mated to the mushroom bolt by aligning the lower portion 202*b* over the fastener 300. The mushroom bolt serving as connector 300 is then inserted through lower portion 202*b* of the storm panel 200, and the storm panel 200 is then pulled in a downward direction such that the upper portion 202*a* of the keyhole slot 202 is engaged with the connector 300.

In yet additional embodiments, a mushroom bolt or other hardware can be integrally formed as part of the window or integrally attached directly to the window system 100, without a female PanelMate® anchor or other hardware. In such embodiments, the mushroom bolt or other attached hardware would itself function as a mounting base 130. In such an embodiment, the storm panel 200 would be attached as described above, with the mushroom bolt or other integral hardware functioning as the mounting base 130 as opposed to a connector. Thus, the present invention contemplates that certain hardware can serve as a connector 300 in some embodiments and as a mounting base 130 in other embodiments.

In another aspect, the present invention includes methods for removably mating an object to a window system. The methods provide a simple and convenient manner of removably mating an attachment to a window system. In addition to convenience, the method can provide a manner of quick mating that is often essential, such as mating storm protection apparatus to a window system when storm conditions are present or imminent.

These methods are practiced by removably mating an attachment to a window system by use of at least one mounting base integral to the window system. In some embodiments, the attachment is directly mated with the mounting base, whereas in other embodiments a connector may be utilized to removably mate the attachment to the window system. In some embodiments using a connector, the connector will be mated to the mounting base before the attachment is mated, whereas this order will be reversed in other embodiments such that the connector is mated to the mounting system after the attachment is mated to the connector. Under this method, an attachment can be mated to the front and/or back side of the window.

For instance, as described above with regard to an embodiment using a mushroom bolt as a mounting base 130 and a storm panel 200 with keyhole slots as the attachment, the storm panel 200 is directly mated to the mounting base 130. By contrast, a connector 300 is engaged with the mounting base 130 to mate the storm panel 200 to the window system 100 in the embodiment described above in which a PanelMate® anchor serves as the mounting base 130 and a mushroom bolt is used as the connector 300. Similarly, a male wingnut may used as a connector 300 in another embodiment described above. These descriptions are illustrative only and one of ordinary skill in the art will appreciate alternative embodiments from these examples.

One embodiment of a mounting base is demonstrated by FIGS. 5 through 20. This embodiment of a mounting base 500 may comprise a female body 502, and a male body 504 that engages the female body. The female body engages a flat plane 506 of a window frame 510. A fastener 508 may engage the male body, with a fastener used to hold an accessory 512 or other attachment in place relative to the window system.

In the embodiment shown in FIGS. 5 through 20, the mounting base comprises a female body having an oblong shape, such that a length of the device is greater than the width when viewed from the top. The female body has an oblong shape to resist torquing forces applied to the mounting base, and to transmit loads and forces on the mounting base to the window frame in a manner that will prevent the mounting base from pulling out or otherwise disengaging from the window frame. The oblong shape spreads forces across a larger cross-section of frame than does a round base. As a round mounting base, a load on may distort and tear the frame, resulting in the round mounting base pulling out. The oblong shape provides added shear and compressive area of contact keeping the mounting base engaged during impact and cycling loads. The oblong shape also resists torquing during insertion and removal of fasteners. The oblong shape also provides a more aesthetically pleasing attachment device.

The female body has a head 514, a neck 516, shoulders 518 and a foot 520 in the embodiment as shown. The female body has a central receptacle 522 that runs longitudinally through the female body. In the embodiment as shown, the receptacle is continuous and is open at each end, which allows displacement of the sides of the body toward each other for positioning the female body in the window frame, and allows the male body to push the female body against the window frame to hold the mounting base in place.

The male body 504 is formed to engage the central receptacle of the female body. The male body is preferred to have an upper end that is enlarged relative to the lower portion, for easy insertion into the female body. The smaller, lower portion and tapered sides make placement of the male body into the female body an easy task. The male body has an interference fit relative to the female body, and in one embodiment, the interference fit is 0.020 to 0.040 inches. As shown, the male body is elongated and engages substantially the entire length of the central receptacle of the female body.

Figure 12:
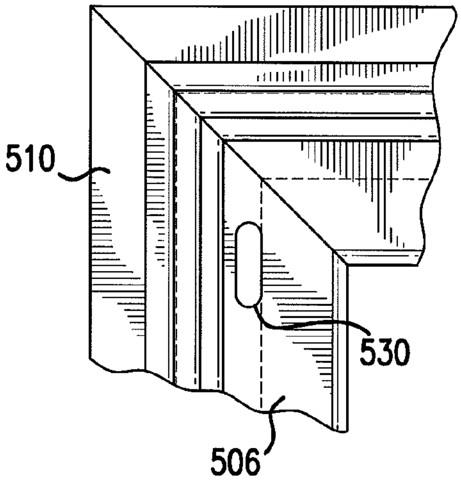

In use, an oblong hole 530 is formed in a flat outside surface plane 506 of the window frame. FIG. 12. The hole may be formed on an interior or exterior surface, but most commonly, may be formed on an exterior surface of the window frame. The width of the oblong hole is formed to receive the neck of the female body when the female body is not under compression, and the oblong hole is smaller in width than the head and shoulders of the female body when the female body is not under compression. The length of the hole is sufficient to accept the length of the female body at the neck of the female body. Multiple holes may be similarly formed at other areas of the window frame for mounting multiple mounting bases as desired or required.

Figure 13:
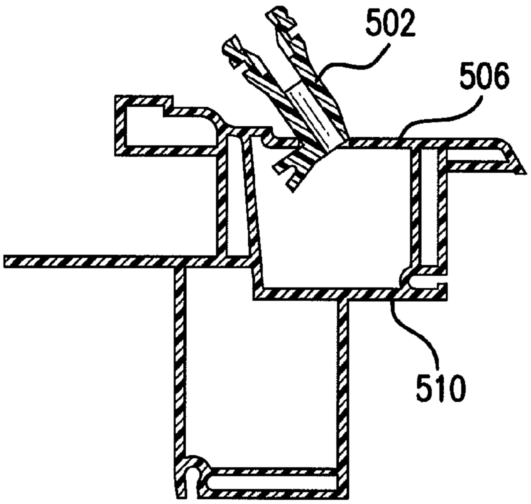

The device may be assembled to the window frame as shown in FIGS. 13 through 20. The female body is inserted into the hole 530. The male body is not present in the central void of the female body. In the embodiment as shown, the female body has a foot 520. The foot is inserted into the hole first by tilting the female body as shown in FIG. 13, since the foot is wider than the hole formed in the window frame.

Figure 14:
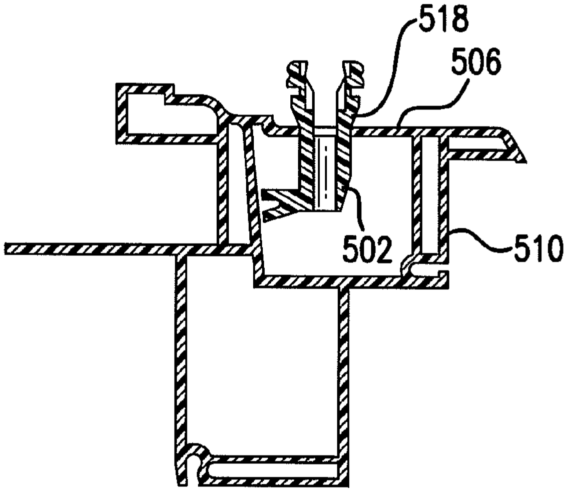
Figure 15:
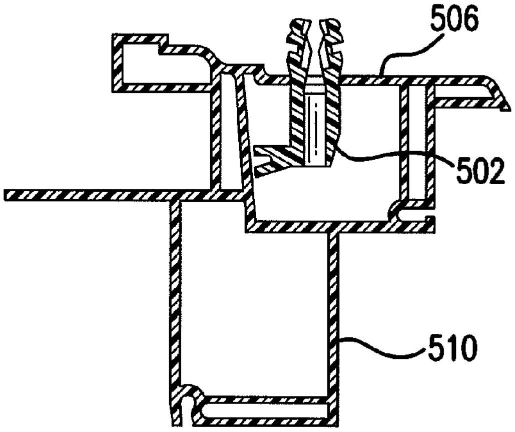
Figure 16:
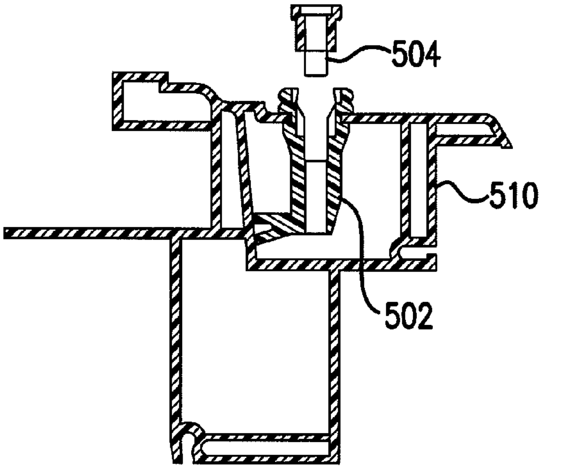

The female body is then rotated to an upright position as shown in FIG. 14, and pressed toward the internal structure of the window frame 510. Since the shoulders 518 are wider than the hole 530, travel of the female body is limited by the shoulders. The opposing sides of the head are compressed toward each other and toward the central receptacle of the female body, which reduces the shoulders to a dimension that allows the shoulders to pass into the hole. FIG. 15. Once the shoulders pass through the hole and into the interior of the window frame, compression is released so that the head does not pass into the hole, and the plane 506 of the window frame engages the neck 516. FIG. 16. The female body is temporarily held in place by the shoulders on the interior side of the plane 506 and the head on the exterior side of the plane, as the plane engages the neck.

The female body has an optional foot 520. Many window structures, such as vinyl windows in common use, have support members in the interior of the window, such as those shown in FIGS. 13 through 19. The foot may be used to engage or abut the support members to further secure the female body and the mounting base. The foot as shown extends generally horizontally from the female body and is part of the female body. The foot may comprise horizontal and or vertical slots or other engagement slots or devices to engage the internal structures of the window frame.

Figure 17:
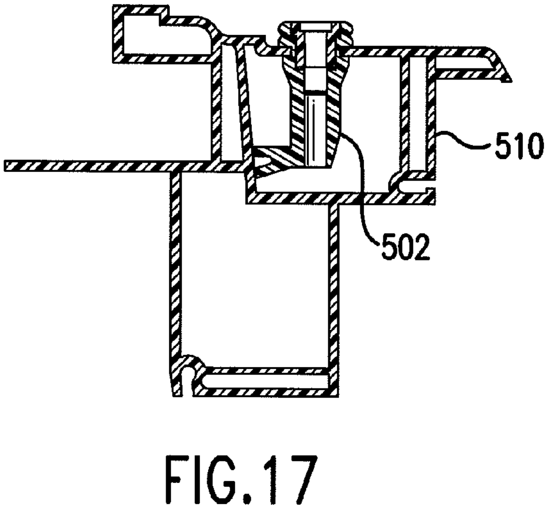
Figure 20:
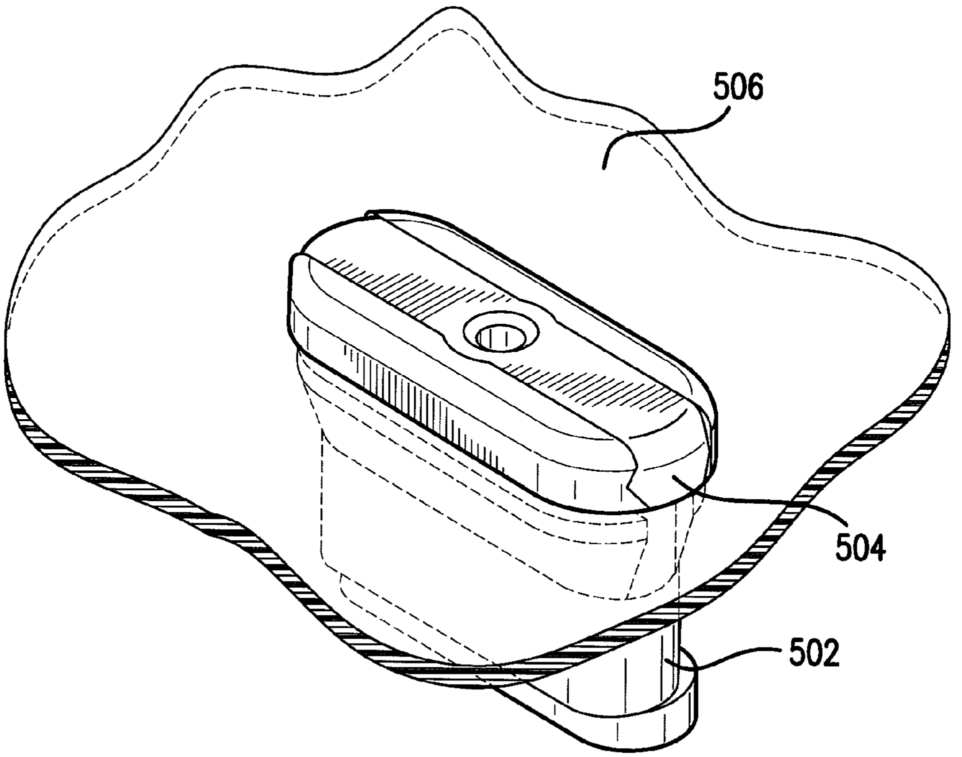
FIG. 20 is a perspective view of the mounting base in position in the window frame.

After the female body is in position as shown in FIG. 16, the male body is inserted into the central receptacle of the female body. The male body is slightly wider than the female body so as to form an interference fit with the female body. The central receptacle 522 is preferred to have a taper, or be of smaller dimension, at a lower portion than near the head, with the male body having a counterpart taper that is wider at the upper portion for ease of positioning of the male body, and so that the male body forms a wedge that pushes the neck of the female body against the plane of the window frame to hold the mounting base in position. With the male body in place in the central receptacle as shown in FIG. 17 and FIG. 20, the female body cannot be pulled away from the window frame without deforming the window frame.

The male body as shown has a hole or void 532 that receives a fastener. The hole or void may be round for receiving a round fastener, such as a screw. A hole or void that is concentric with hole or void 534 may be present in the female body for receiving the fastener. Hole or void 534 may be in the center of the central receptacle.

Figure 18:
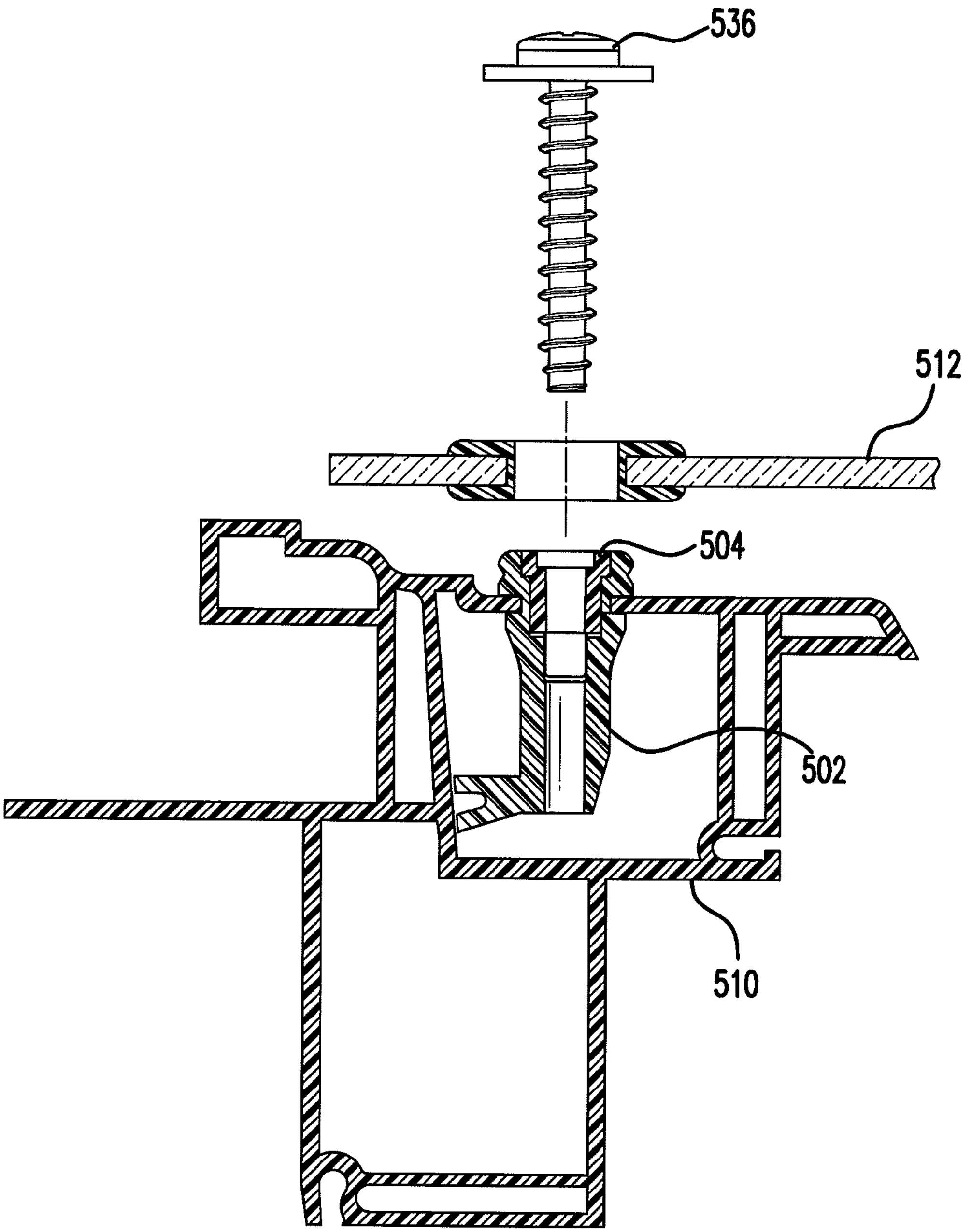
Figure 19:
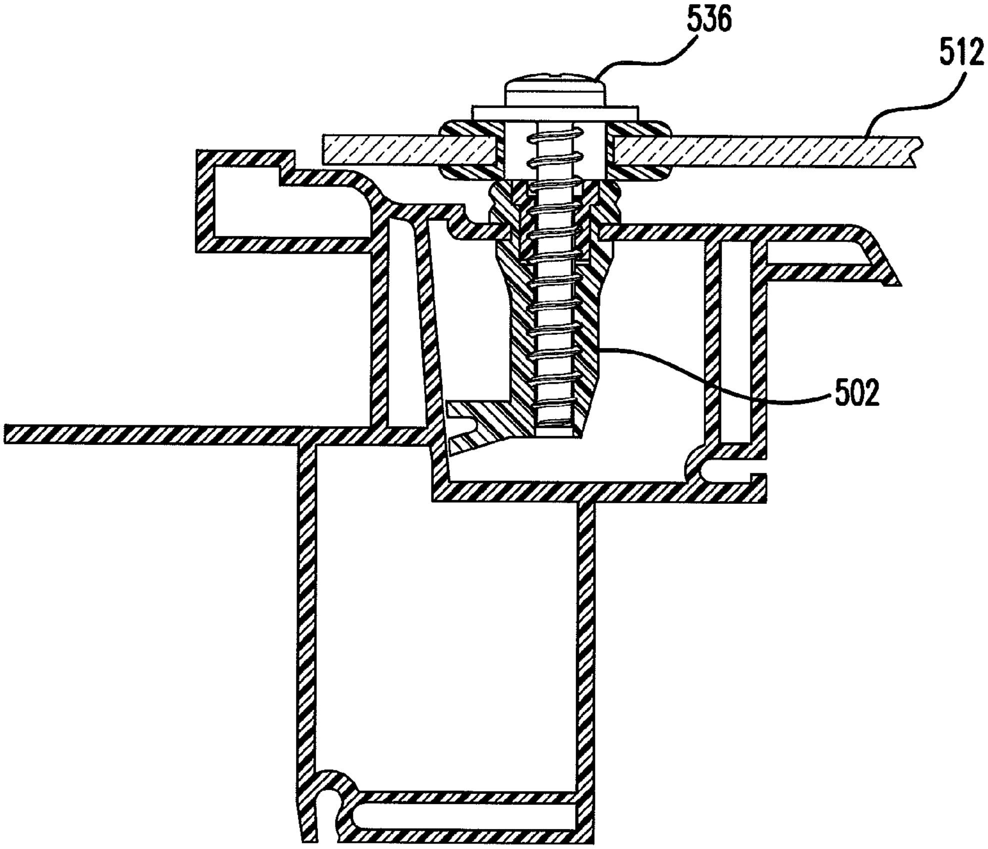

A fastener 536, which may be a screw, engages the male body and may engage the female body through voids 532 and 534. FIGS. 18 and 19. The fastener passes through an accessory or attachment that is to be attached to the window frame, and holds the accessory 512 in place against the window frame. The head 504 may act as a spacer. The fastener may engage threads formed in the male body and/or female body, or the fastener could be a self tapping screw, or the fastener could be other types of know fasteners.

The male body and female body are preferred to be formed of materials that are corrosion resistant, particularly to weather and salt air environments, and are resistant to UV exposure, while not being subject to breaking when loads are applied to the material. Injection molded plastics may be used to form the male and female body, and thermoplastics, polymers, PVC, acrylonitrile-butadiene-styrene (ABS) and acrylic-styrene-acrylonitrile (ASA) copolymers may be used. A preferred material is GELOY, and particularly GELOY® CR7520.

In yet another aspect, the present invention includes methods for manufacturing a window system with at least one mounting base integral to the window system and for retrofitting an existing window to include at least one mounting base integral to the window system.

To manufacture a window system of the current invention, at least one window pane is mounted and secured within at least one window sash, wherein the sash surrounds the entire window pane. At least one integral mounting base is integrally formed or installed onto the window frame and/or sash, and the integral mounting base can be installed on the front side and/or the back side of the window. The mounting base can be created during extrusion or it can subsequently be mounted by any conventional means, such as drilling, hammering, soldering, welding, screwing, or other like means.

Existing windows can be retrofitted by installing at least one mounting base integral to window frame and/or window sash of the existing window. The existing window can be retrofitted before or after being installed within a structure, and the mounting base can be installed on the front side or the back side of an installed window system. The mounting base can be installed into an existing window system by any conventional means, such as drilling, hammering, soldering, welding, screwing, or other like means.

Additional steps may be taken in certain embodiments of manufacturing a window system with a mounting base or retrofitting an existing window system to include a mounting base. In some embodiments, a solid, liquid, paste, and/or foam is inserted or injected or otherwise provided in the interior of the window frame to further secure the mounting base to the window system. In other embodiments, the mounting base is installed to extend through the entire window frame or sash.

It is to be understood that the present invention is not limited to windows, and the invention further encompasses other openings in structures, such as doors and the like.

The present invention eliminates the necessity of attaching devices, such as storm panels, directly to structures. By eliminating this method of attachment, the aesthetic integrity of the structure is maintained due to the elimination of unsightly mounting tracks or devices for storing rolled hurricane shutters. Additionally, holes need not be formed in the structure surface, maintaining the physical integrity of the structure coverings, such as vinyl siding, hardy plank siding, wood, brick, stucco, or other known structural coverings.

As various changes could be made in the above embodiments and descriptions by those of ordinary skill in the art without departing from the scope of the invention, it is intended that all matter contained in the above description and shown in the accompanying drawings shall be interpreted as illustrative and not in a limiting sense. Skilled artisans will recognize that the given examples have many alternatives that fall within the scope of the invention. In addition, it should be understood that aspects of the various embodiments may be interchanged in whole or in part.

What is claimed is:

1. A mounting base for a window frame, comprising:

a female body having an elongated shape, the female body comprising a head that comprises the elongated shape, the female body having an elongated and transverse slot therein that bisects the head and a portion of the female body that adjoins the head, the elongated and transverse slot defining a first opposing side of the female body and a second opposing side of the female body;

an elongated male body that engages the elongated and transverse slot in the female body;

a foot that extends laterally from only one side of an end of the female body that is opposite the head; and wherein the female body comprises a neck positioned below the head, the neck having a reduced dimension from the head, wherein the neck is present in the first opposing side of the female body that is displaceable towards the elongated and transverse slot and the neck is positioned opposite the elongated and transverse slot, and the neck is present in the second opposing side of the female body and the neck is positioned opposite the elongated and transverse slot.

2. A mounting base for a window frame as described in claim 1, wherein the female body comprises an elongated and generally oval shape, and wherein the female body has an arcuate shape on a first end thereof that is adjacent to the first end of the head, and the first end of the female body is constructed and arranged to engage a first arcuate end of the elongated opening of the window frame, and wherein the female body has an arcuate shape on a second end thereof that is adjacent to the second end of the head, and the second end of the female body is constructed and arranged to engage a second arcuate end of the elongated opening of the window frame.

3. A mounting base for a window frame as described in claim 1, wherein the foot extends laterally from an end of the female body that is opposite the head, and wherein an end of the foot that is opposite the female body comprises a first member that is positioned over and spaced apart from a second member.

4. A mounting base for a window frame as described in claim 1, wherein the male body has a width that exceeds the distance between the first opposing side of the female body and the second opposing side of the female body to hold the female body in position in the elongated opening of the window frame.

5. A mounting base for a window frame as described in claim 1, the mounting base for a window frame further comprising a fastener, wherein the fastener is a threaded fastener, and a void in the female body is threaded to engage the threaded fastener.

6. A mounting base for a window frame as described in claim 1, wherein the foot is further comprising an elongated foot that extends laterally from one end of the female body that is opposite the head, wherein an end of the foot that is opposite the female body is substantially flat along its length.

7. A mounting base for a window frame as described in claim 1, further comprising a fastener that passes through the male member and engages the female body.

8. A mounting base for a window frame as described in claim 1, further comprising a fastener, wherein the fastener comprises a shaft that passes through and out of a lower end of the male member and engages the female body, and the fastener comprising a head that is positioned against a top of the male member.

9. A mounting base for a window frame as described in claim 1, wherein when the male body is fully engaged within the transverse slot of the female body, and prior to insertion of the fastener in the void in the female body, the female body cannot be pulled away from the window frame without deforming the opening in the exterior of the window frame prior to insertion of the fastener.

10. A mounting base for a window frame as described in claim 1, wherein the first opposing side of the female body is displaceable toward the elongated and transverse slot and the second opposing side of the female body by application of pressure and returns to a normal position upon withdrawing of pressure.

11. A mounting base for a window frame as described in claim 1, wherein a side of the elongated male body comprises an enlarged arcuate portion extending outwardly from the side of the elongated male body that engages an arcuate receiving void formed in the elongated and transverse slot in the female body.

12. A mounting base for a window frame as described in claim 1, wherein a first side of the elongated male body comprises an enlarged arcuate portion extending outwardly from the first side of the elongated male body that engages a corresponding first arcuate receiving void formed in the elongated and transverse slot in the female body, and wherein a second side of the elongated male body that is directly opposite the enlarged arcuate portion of the first side of the male body comprises an enlarged arcuate portion extending outwardly from the second side that engages a corresponding second arcuate receiving void formed in the elongated and transverse slot in the female body.

13. A mounting base for a window frame as described in claim 1, wherein a side of the elongated male body comprises an arcuate portion that engages a corresponding arcuate receiving void formed in the elongated and transverse slot in the female body, and further comprising a fastener that is present in a void in the male member that is adjacent to the arcuate portion of the male member, and wherein the fastener engages the female body.

14. A mounting base for a window frame as described in claim 1, wherein the head is enlarged relative to a lower portion of the female body, and wherein the lower portion of the female body comprises generally straight sides.

15. A mounting base for a window frame as described in claim 1, wherein the head is enlarged relative to a lower portion of the female body, wherein the lower portion of the female body is positioned between the head and the foot.

* * * * *